(12) United States Patent
Colborn et al.

(10) Patent No.: US 6,911,274 B1
(45) Date of Patent: Jun. 28, 2005

(54) FUEL CELL SYSTEM

(75) Inventors: Jeffrey A. Colborn, Cardiff by the Sea, CA (US); Martin De Tezanos Pinto, Carlsbad, CA (US); Stuart I. Smedley, Escondido, CA (US)

(73) Assignee: Metallic Power, Inc., Carlsbad, CA (US)

( * ) Notice: Subject to any disclaimer, the term of this patent is extended or adjusted under 35 U.S.C. 154(b) by 462 days.

(21) Appl. No.: 10/066,544

(22) Filed: Oct. 19, 2001

(51) Int. Cl.$^7$ .............................................. H01M 8/004
(52) U.S. Cl. .............................. 429/19; 429/17; 429/34
(58) Field of Search ............................... 429/17, 19, 34

(56) References Cited

U.S. PATENT DOCUMENTS

| | | | |
|---|---|---|---|
| 3,440,098 A | 4/1969 | Stachurski | 136/6 |
| 3,451,851 A | 6/1969 | Stanimirovitch | 136/30 |
| 3,639,173 A | 2/1972 | Stachurski | 136/3 |
| 3,660,170 A | 5/1972 | Rampel | 136/154 |
| 3,663,298 A | 5/1972 | McCoy et al. | 136/31 |
| 3,716,413 A | 2/1973 | Eisner | 136/86 |
| 3,767,466 A | 10/1973 | McCoy et al. | 136/131 |
| 3,811,952 A | 5/1974 | Siwersson et al. | 136/86 |
| 3,847,671 A | 11/1974 | Leparulo et al. | 136/86 |
| 3,879,225 A | 4/1975 | Backhurst et al. | 136/86 |
| 3,902,918 A | 9/1975 | Pompon | 136/86 |
| 3,930,882 A | 1/1976 | Ohsawa et al. | 136/30 |
| 3,944,430 A | 3/1976 | Lee | 136/30 |
| 3,970,472 A | 7/1976 | Steffensen | 136/3 |
| 3,981,747 A | 9/1976 | Doniat et al. | 429/15 |
| 3,985,581 A | 10/1976 | Stachurski et al. | 429/51 |
| 4,074,028 A | 2/1978 | Will | 429/105 |
| 4,105,829 A | 8/1978 | Venero | 429/15 |
| 4,127,701 A | 11/1978 | Symons et al. | 429/19 |
| 4,145,482 A | 3/1979 | von Benda | 429/27 |
| 4,147,839 A | 4/1979 | Solomon et al. | 429/15 |
| 4,172,924 A | 10/1979 | Warszawski | 429/15 |

(Continued)

FOREIGN PATENT DOCUMENTS

| | | |
|---|---|---|
| EP | 0568822 A2 | 11/1993 |
| EP | 0755088 A2 | 1/1997 |
| FR | 2639767 | 11/1988 |
| FR | 2669775 | 11/1990 |
| JP | 51-494439 | 4/1976 |
| WO | WO 00/38260 | 6/2000 |

OTHER PUBLICATIONS

Linden, David "Handbook of Batteries", 2$^{nd}$, ed., McGraw–Hill Inc., 1995, pp. 5.15–5.16.*

Cooper, J., et al.; *Demonstration of a Zinc/Air Fuel Battery to Enhance the Range and Mission of Fleet Electric Vehicles: Preliminary Results in the Refueling of a Multicell Module*, 29$^{th}$ no date.

Cooper, J.; *How the Zinc/Air Battery is Refueling the Competitiveness of Electric Vehicles*; Science & Technology Review ; Oct. 1995; pp. 7–13.

*Primary Examiner*—John S. Maples
(74) *Attorney, Agent, or Firm*—Howrey Simon Arnold & White LLP

(57) ABSTRACT

A fuel cell system is described which comprises a power source and a fuel storage unit. A flowable fuel is contained with the fuel storage unit. A first flow path delivers fuel from the fuel storage unit to the power source. Some or all of this fuel is deposited into the individual cell cavities within the power source. A second flow path delivers fuel that is not deposited into the cell cavities to the fuel storage unit. A third flow path delivers unused and/or partially used fuel and/or reaction products and/or spent reaction solution from the cell cavities back to an optional reaction product storage unit and/or the fuel storage unit and/or to the second flow path. The system may further comprise an optional reaction product storage unit, an optional regeneration unit, an optional second reactant storage unit, an optional controller, and an optional power converter.

4 Claims, 3 Drawing Sheets

U.S. PATENT DOCUMENTS

| | | | |
|---|---|---|---|
| 4,198,475 A | 4/1980 | Zaromb | 429/15 |
| 4,218,521 A | 8/1980 | Putt et al. | 429/39 |
| 4,272,333 A | 6/1981 | Scott et al. | 204/23 |
| 4,287,273 A | 9/1981 | Harney et al. | 429/153 |
| 4,352,864 A | 10/1982 | Struthers | 429/18 |
| 4,362,789 A * | 12/1982 | Dighe | 429/17 |
| 4,415,636 A | 11/1983 | Charkey | 429/27 |
| 4,479,856 A | 10/1984 | Ando | 204/55 |
| 4,485,154 A | 11/1984 | Remick et al. | 429/14 |
| 4,563,403 A | 1/1986 | Julian | 429/198 |
| 4,730,153 A | 3/1988 | Breting et al. | 320/14 |
| 4,731,547 A | 3/1988 | Alenduff et al. | 307/85 |
| 4,802,100 A | 1/1989 | Aasen et al. | 364/494 |
| 4,828,939 A | 5/1989 | Turley et al. | 429/38 |
| 4,842,963 A | 6/1989 | Ross, Jr. | 429/21 |
| 4,855,030 A | 8/1989 | Miller | 204/212 |
| 4,950,561 A | 8/1990 | Niksa et al. | 429/27 |
| 5,006,424 A | 4/1991 | Evans et al. | 429/15 |
| 5,156,925 A | 10/1992 | Lapp | 429/19 |
| 5,188,911 A | 2/1993 | Downing et al. | 429/70 |
| 5,196,275 A | 3/1993 | Goldman et al. | 429/27 |
| 5,208,526 A | 5/1993 | Goldman et al. | 320/2 |
| 5,260,144 A | 11/1993 | O'Callaghan | 429/14 |
| 5,312,699 A | 5/1994 | Yanagi et al. | 429/22 |
| 5,316,869 A | 5/1994 | Perry, Jr. et al. | 429/19 |
| 5,318,861 A | 6/1994 | Harats et al. | 429/21 |
| 5,346,778 A | 9/1994 | Ewan et al. | 429/19 |
| 5,348,820 A | 9/1994 | Suga et al. | 429/216 |
| 5,360,680 A | 11/1994 | Goldman et al. | 429/27 |
| 5,366,829 A | 11/1994 | Saidi | 429/216 |
| 5,369,353 A | 11/1994 | Erdman | 323/207 |
| 5,378,329 A | 1/1995 | Goldstein et al. | 204/115 |
| 5,382,482 A | 1/1995 | Suga et al. | 429/206 |
| 5,401,589 A | 3/1995 | Palmer et al. | 429/13 |
| 5,405,713 A | 4/1995 | Pecherer et al. | 429/49 |
| 5,411,815 A | 5/1995 | Goldstein | 429/50 |
| 5,427,872 A | 6/1995 | Shen et al. | 429/142 |
| 5,432,710 A | 7/1995 | Ishimaru et al. | 364/493 |
| 5,434,020 A | 7/1995 | Cooper | 429/210 |
| 5,434,021 A | 7/1995 | Fauteux et al. | 429/213 |
| 5,441,820 A | 8/1995 | Siu et al. | 429/17 |
| 5,462,815 A | 10/1995 | Horiuchi | 429/13 |
| 5,476,293 A | 12/1995 | Yang | 290/4 |
| 5,500,561 A | 3/1996 | Wilhelm | 307/64 |
| 5,547,778 A | 8/1996 | Fauteux et al. | 429/81 |
| 5,558,947 A | 9/1996 | Robison | 429/13 |
| 5,563,802 A | 10/1996 | Plahn et al. | 364/492 |
| 5,569,551 A | 10/1996 | Pedicini et al. | 429/27 |
| 5,578,183 A | 11/1996 | Cooper | 205/64 |
| 5,635,051 A | 6/1997 | Salas-Morales et al. | 205/602 |
| 5,637,414 A | 6/1997 | Inoue et al. | 429/13 |
| 5,780,186 A | 7/1998 | Casey, Jr. | 429/229 |
| 5,783,932 A | 7/1998 | Namba et al. | 322/16 |
| 5,795,666 A | 8/1998 | Johnssen | 429/17 |
| 5,795,679 A | 8/1998 | Kawakami et al. | 429/218 |
| 5,824,434 A | 10/1998 | Kawakami et al. | 429/209 |
| 5,849,427 A | 12/1998 | Siu et al. | 429/19 |
| 5,869,200 A | 2/1999 | Nunnally | 429/10 |
| 5,880,536 A | 3/1999 | Mardirossian | 307/44 |
| 5,885,727 A | 3/1999 | Kawatsu | 429/17 |
| 5,929,538 A | 7/1999 | O'Sullivan et al. | 307/66 |
| 5,952,117 A | 9/1999 | Colborn et al. | 429/27 |
| 5,958,210 A | 9/1999 | Siu et al. | 205/602 |
| 5,961,928 A | 10/1999 | Maston et al. | 422/110 |
| 5,969,435 A | 10/1999 | Wilhelm | 307/64 |
| 5,984,986 A | 11/1999 | Wiesheu et al. | 48/203 |
| 5,985,474 A | 11/1999 | Chen et al. | 429/17 |
| 5,999,888 A | 12/1999 | Aubee | 702/45 |
| 6,051,192 A | 4/2000 | Maston et al. | 422/110 |
| 6,067,482 A | 5/2000 | Shapiro | 700/286 |
| 6,153,329 A | 11/2000 | Raschilla et al. | 429/65 |
| 6,162,555 A | 12/2000 | Gutierrez et al. | 429/15 |
| 6,186,254 B1 | 2/2001 | Mufford et al. | 180/65.3 |
| 6,230,496 B1 | 5/2001 | Hofmann et al. | 60/706 |
| 6,242,873 B1 | 6/2001 | Drozdz et al. | 318/139 |
| 6,296,958 B1 | 10/2001 | Pinto et al. | 429/15 |
| 6,321,145 B1 | 11/2001 | Rajashekara | 701/22 |
| 6,326,763 B1 | 12/2001 | King et al. | 320/101 |
| 2001/0049039 A1 * | 12/2001 | Haltiner, Jr. | 429/24 |
| 2003/0035984 A1 * | 2/2003 | Colborn | 429/23 |

* cited by examiner

FUEL CELL SYSTEM

1. Field of the Invention

This invention relates generally to power supplies for providing primary and/or auxiliary/backup power to electrical equipment, and, more specifically, to power supply systems based on metal- or hydrogen-fuel cells.

2. Related Art

A great deal of electronic equipment in the modern world relies upon high-quality, reliable electrical power. Such equipment, each a load, includes, for example and without limitation, lawn & garden equipment; radios; telephone; targeting equipment; battery rechargers; laptops; communications devices; sensors; night vision equipment; camping equipment (including without limitation, stoves, lanterns, lights, and the like); lights; vehicles (including without limitation, cars, recreational vehicles, trucks, boats, ferries, motorcycles, motorized scooters, forklifts, golf carts, lawnmowers, industrial carts, passenger carts (airport), luggage handling equipment (airports), airplanes, lighter than air crafts (e.g., blimps, dirigibles, and the like), hovercrafts, trains (e.g., locomotives, and the like), and submarines (manned and unmanned); torpedoes; security systems; electrical energy storage devices for renewable energy sources (e.g., solar-based, tidal-based, hydro-based, wind-based, and the like); many other types of electrical devices, equipment for which a primary and/or backup power source is necessary or desirable to enable the equipment to function for its intended purpose, military-usable variants of above, and the like; and suitable combinations of any two or more thereof. Over the past decade, as the digital age has taken hold, there has been an explosive growth in the deployment of such equipment.

For many applications of such equipment, power outages can lead to losses of use or data, equipment damage, missed deadlines, and/or lost productivity, and therefore must be avoided. At the same time, the reliability of the traditional power generation, transmission, and distribution network has fallen in some countries due in part to the increased demands which have been placed on this network throughout the world. The result is that fuel cell systems have emerged as a means for providing primary and/or backup power to such equipment.

RELATED APPLICATION

This application is related to U.S. patent application Ser. No. 09/930,557, entitled "POWER SYSTEM INCLUDING HEAT REMOVAL UNIT FOR PROVIDING BACKUP POWER TO ONE OR MORE LOADS," filed August 15, 2001; U.S. patent application Ser. No. 09/930,394, entitled "METAL FUEL CELL SYSTEM FOR PROVIDING BACKUP POWER TO ONE OR MORE LOADS," filed Aug. 15, 2001; U.S. Provisional Application No. To Be Determined, entitled "ULTRA-LONG DURATION BACKUP FOR CRITICAL APPLICATIONS USING ZINC/AIR REGENERATIVE FUEL CELLS,", filed Sep. 10, 2001; and U.S. Provisional Application No. To Be Determined, entitled "ULTRA-LONG DURATION BACKUP FOR TELECOMMUNICATIONS APPLICATIONS USING ZINC/AIR REGENERATIVE FUEL CELLS," filed Oct. 11, 2001; U.S. patent application Ser. No. _____ To Be Determined, entitled "METHODS OF PRODUCING OXYGEN REDUCTION CATALYST,", filed Oct. 9, 2001; U.S. patent application Ser. No. _____ To Be Determined, entitled "RECIRCULATING ANODE,", filed on even date herewith; U.S. patent application Ser. No. _____ To Be Determined, entitled "MANIFOLD FOR FUEL CELL SYSTEM,", filed on even date herewith; U.S. patent application Ser. No. _____ To Be Determined, entitled "METHODS OF USING FUEL CELL SYSTEM CONFIGURED TO PROVIDE POWER TO ONE OR MORE LOADS,", filed on even date herewith, and U.S. patent application Ser. No. _____ To Be Determined, entitled "POLYMER COMPOSITES, CATHODES, AND SYSTEMS THEREOF,", filed on even date herewith. Each of these applications is hereby fully incorporated by reference herein as though set forth in full.

SUMMARY

The invention provides a fuel cell system comprising a power source and a fuel storage unit. A flowable fuel is contained with the fuel storage unit. A first flow path delivers fuel from the fuel storage unit to the power source. Some or all of this fuel is deposited into the individual cell cavities within the power source. A second flow path delivers fuel that is not deposited into the cell cavities to the fuel storage unit. A third flow path delivers unused and/or partially used fuel and/or reaction products and/or spent reaction solution from the cell cavities back to an optional reaction product storage unit and/or the fuel storage unit and/or to the second flow path. The system may further comprise an optional reaction product storage unit, an optional regeneration unit, an optional second reactant storage unit, an optional controller, and an optional power converter.

In the case in which the second reactant is oxygen provided from the ambient air, a scrubber may be provided in order to remove carbon dioxide therefrom. However, such may not be needed if the second reactant is oxygen as obtained from a purified oxygen source.

In the case in which a liquid electrolyte is provided within the cell cavities, or to remove other substances from air expelled from the cell cavities, a demister may be provided to demist air expelled from the cell cavities, i.e., remove droplets of electrolyte which have emerged from the cell cavities into the outgoing air.

A voltage booster may also be provided to boost the voltage output of the fuel cell as this voltages due to buildup of reaction product(s) in the cell cavities.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
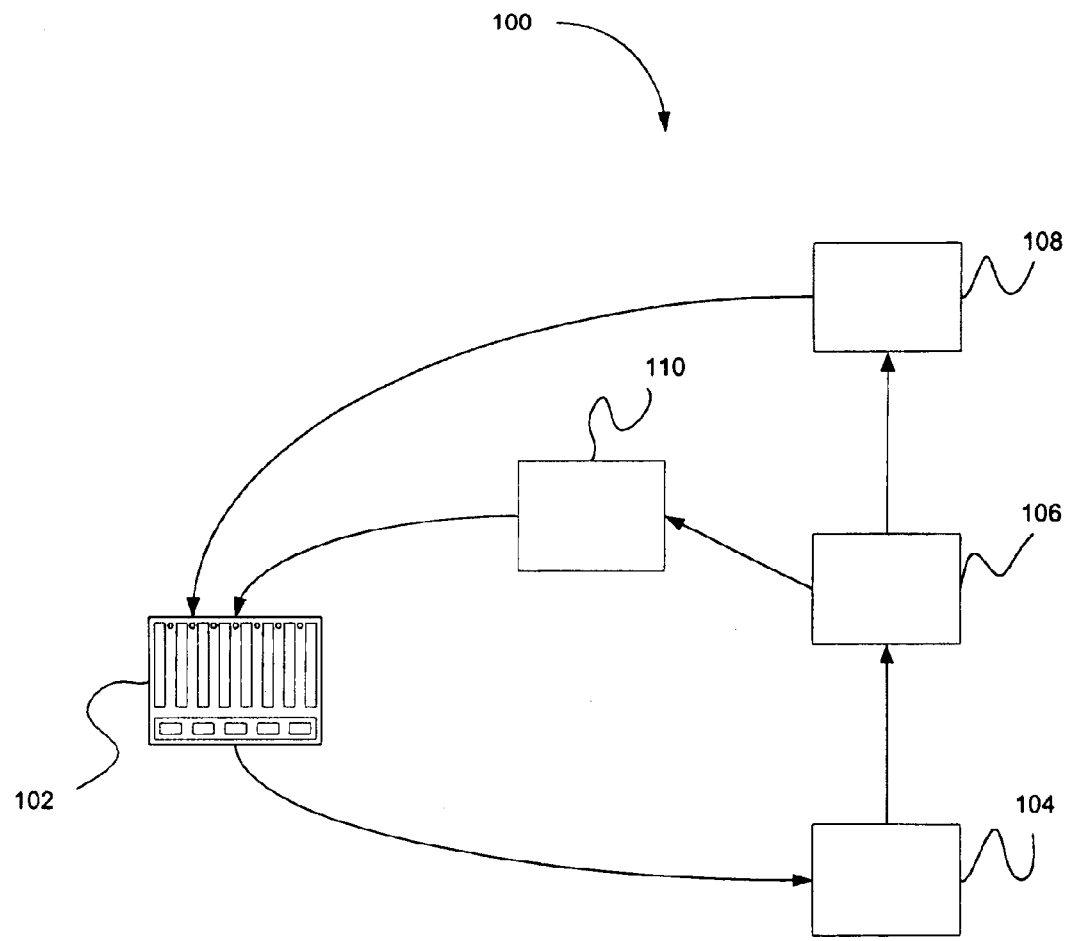
FIG. 1 is a block diagram of one embodiment of a fuel cell.

A block diagram of one embodiment of a fuel cell is illustrated in FIG. 1. As illustrated, the fuel cell comprises a power source 102, an optional reaction product storage unit 104, an optional regeneration unit 106, a fuel storage unit 108, and an optional second reactant storage unit 110. The power source 102 in turn comprises one or more cells each having a cell body defining a cell cavity, with, an anode and cathode situated in each cell cavity. The cells can be coupled in parallel or series. In one implementation, they are coupled in series to form a cell stack.

The anodes within the cell cavities in power source 102 comprise the fuel stored in fuel storage unit 108. Within the cell cavities of power source 102, an electrochemical reaction takes place whereby the anode releases electrons, and forms one or more reaction products. Through this process, the anodes are gradually consumed.

The released electrons flow through a load to the cathode, where they react with one or more second reactants from an optional second reactant storage unit 110 or from some other source. This flow of electrons through the load gives rise to an overpotential (i.e., work) required to drive the demanded current, which overpotential acts to decrease the theoretical voltage between the anode and the cathode. This theoretical voltage arises due to the difference in electrochemical potential between the anode (Zn potential of −1.215V versus SHE (standard hydrogen electrode) reference at open circuit) and cathode (O2 potential of +0.401V versus SHE reference at open circuit). When the cells are combined in series, the sum of the voltages for the cells forms the output of the power source.

The one or more reaction products can then be provided to optional reaction product storage unit 104 or to some other destination. The one or more reaction products, from unit 104 or some other source, can then be provided to optional regeneration unit 106, which regenerates fuel and/or one or more of the second reactants from the one or more reaction products. The regenerated fuel can then be provided to fuel storage unit 108, and/or the regenerated one or more second reactants can then be provided to optional second reactant storage unit 110 or to some other destination. As an alternative to regenerating the fuel from the reaction product using the optional regeneration unit 106, the fuel can be inserted into the system from an external source and the reaction product can be withdrawn from the system.

The optional reaction product storage unit 104 comprises a unit that can store the reaction product. Exemplary reaction product storage units include without limitation one or more tanks, one or more sponges, one or more containers, one or more vats, one or more barrels, one or more vessels, and the like, and suitable combinations of any two or more thereof. Optionally, the optional reaction product storage unit 104 is detachably attached to the system.

The optional regeneration unit 106 comprises a unit that can electrolyze the reaction product(s) back into fuel (e.g., hydrogen, metal particles and/or metal-coated particles, and the like) and/or second reactant (e.g., air, oxygen, hydrogen peroxide, other oxidizing agents, and the like, and suitable combinations of any two or more thereof). Exemplary regeneration units include without limitation water electrolyzers (which regenerate an exemplary second reactant (oxygen) and/or fuel (hydrogen) by electrolyzing water), metal (e.g., zinc) electrolyzers (which regenerate a fuel (e.g., zinc) and a second reactant (e.g., oxygen) by electrolyzing a reaction product (e.g., zinc oxide (ZnO)), and the like. Exemplary metal electrolyzers include without limitation fluidized bed electrolyzers, spouted bed electrolyzers, and the like, and suitable combinations of two or more thereof. The power source 102 can optionally function as the optional regeneration unit 106 by operating in reverse, thereby foregoing the need for a regeneration unit 106 separate from the power source 102. Optionally, the optional regeneration unit 106 is detachably attached to the system.

The fuel storage unit 108 comprises a unit that can store the fuel (e.g., for metal fuel cells, metal (or metal-coated) particles or liquid born metal (or metal-coated) particles or suitable combinations thereof; for hydrogen fuel cells, hydrogen or hydrogen containing compounds that can be reformed into a usable fuel prior to consumption). Exemplary fuel storage units include without limitation one or more tanks (for example, without limitation, a high-pressure tank for gaseous fuel (e.g., hydrogen gas), a cryogenic tank for liquid fuel which is a gas at operating temperature (e.g., room temperature) (e.g., liquid hydrogen), a metal-hydride-filled tank for holding hydrogen, a carbon-nanotube-filled tank for storing hydrogen, a non-reactive material, e.g., stainless steel plastic, or the like, tank for holding potassium hydroxide (KOH) and metal (e.g., zinc (Zn), other metals, and the like) particles, a tank for liquid fuel e.g., and alcohol and the like, one or more sponges, one or more containers (e.g., a plastic container for holding dry metal (e.g., zinc (Zn), other metals, and the like) particles, and the like), one or more vats, one or more barrels, one or more vessels, and the like, and suitable combinations of any two or more thereof. Optionally, the fuel storage unit 108 is detachably attached to the system.

The optional second reactant storage unit 110 comprises a unit that can store the second reactant. Exemplary second reactant storage units include without limitation one or more tanks (for example, without limitation, a high-pressure tank for gaseous second reactant (e.g., oxygen gas), a cryogenic tank for liquid second reactant (e.g., liquid oxygen) which is a gas at operating temperature (e.g., room temperature), a tank for a second reactant which is a liquid or solid at operating temperature (e.g., room temperature), and the like), one or more sponges, one or more containers, one or more vats, one or more barrels, one or more vessels, and the like, and suitable combinations of any two or more thereof. Optionally, the optional second reactant storage unit 110 is detachably attached to the system.

In one embodiment, the fuel cell utilized in the practice of the invention system is a metal fuel cell. The fuel of a metal fuel cell is a metal that can be in a form to facilitate entry into the cell cavities of the power source 102. For example, the fuel can be in the form of metal (or metal-coated) particles or liquid born metal (or metal-coated) particles or suitable combinations thereof. Exemplary metals for the metal (or metal-coated) particles include without limitation zinc, aluminum, lithium, magnesium, iron, and the like.

In this embodiment, when the fuel is optionally already present in the anode of the cell cavities in power source 102 prior to activating the fuel cell, the fuel cell is precharged, and can start-up significantly faster than when there is no fuel in the cell cavities and/or can run for a time in the range(s) from about 0.001 minutes to about 100 minutes without additional fuel being moved into the cell cavities. The amount of time which the fuel cell can run on a pre-charge of fuel within the cell cavities can vary with, among other factors, the pressurization of the fuel within the cell cavities, and alternative embodiments of this aspect of the invention permit such amount of time to be in the range(s) from about 1 second to about 100 minutes or more, and in the range(s) from as, about 30 seconds to about 100 minutes or more.

Moreover, the second reactant optionally can be present in the fuel cell and pre-pressurized to any pressure in the range(s) from about 0.01 psi gauge pressure to about 200 psi gauge pressure prior to a an outage sense time after the controller sensing the power outage condition to facilitate the fuel cell's start-up in a timeframe significantly faster than when there is no second reactant present and no pre-pressurization in the fuel cell prior to the optional controller sensing the power outage condition. Optionally, the one or more second reactants are present in the power source 102 at a time prior to an outage sense time, which outage sense time is in the range(s) from about 10 microseconds to about 10 seconds after the controller has sensed outage of primary power to the one or more loads system. Optionally, this time is also after the controller has sensed outage of primary power to the one or more loads.

Moreover, in this embodiment, one optional aspect provides that the volumes of one or both of the fuel storage unit 108 and the optional second reactant storage unit 110 can be independently changed as required to independently vary the energy of the system from its power, in view of the requirements of the system. Suitable such volumes can be calculated by utilizing, among other factors, the energy density of the system, the energy requirements of the one or more loads of the system, and the time requirements for the one or more loads of the system. In one embodiment, these volumes can vary in the range(s) from about 0.001 liters to about 1,000,000 liters.

In one aspect of this embodiment, at least one of, and optionally all of, the metal fuel cell(s) is a zinc fuel cell in which the fuel is in the form of fluid borne zinc particles immersed in a potassium hydroxide (KOH) electrolytic reaction solution, and the anodes within the cell cavities are particulate anodes formed of the zinc particles. In this embodiment, the reaction products can be the zincate ion, $Zn(OH)_4^{2-}$, or zinc oxide, $ZnO$, and the one or more second reactants can be an oxidant (for example, oxygen (taken alone, or in any organic or aqueous (e.g., water-containing) fluid (for example and without limitation, liquid or gas (e.g., air)), hydrogen peroxide, and the like, and suitable combinations of any two or more thereof). When the second reactant is oxygen, the oxygen can be provided from the ambient air (in which case the optional second reactant storage unit 10 can be Phi excluded), or from the second reactant storage unit 10. Similarly, when the second reactant is oxygen in water, the water can be provided from the second reactant storage unit 110, or from some other source, e.g., tap water (in which case the optional second reactant storage unit 110 can be excluded). In order to replenish the cathode, to deliver second reactant(s) to the cathodic area, and to facilitate ion exchange between the anodes and cathodes, a flow of the second reactant(s) can be maintained through a portion of the cells. This flow optionally can be maintained through one or more pumps (not shown in FIG. 1), blowers or the like, or through some other means.

In this embodiment, the particulate anodes are gradually consumed through electrochemical dissolution. In order to replenish the anodes, to deliver KOH to the anodes, and to facilitate ion exchange between the anodes and cathodes, a recirculating flow of the fuel borne zinc particles can be maintained through the cell cavities. This flow can be maintained through one or more pumps (not shown) or through some other means. As the potassium hydroxide contacts the zinc anodes, the following reaction takes place at the anodes:

$$Zn + 4OH^- \rightarrow Zn(OH)_4^{2-} + 2e^- \tag{1}$$

The two released electrons flow through a load to the cathode where the following reaction takes place:

$$\tfrac{1}{2}O_2 + 2e^- + H_2O \rightarrow 2OH^- \tag{2}$$

The reaction product is the zincate ion, $Zn(OH)_4^{2-}$, which is soluble in the reaction solution KOH. The overall reaction which occurs in the cell cavities is the combination of the two reactions (1) and (2). This combined reaction can be expressed as follows:

$$Zn + 2OH^- + \tfrac{1}{2}O_2 + H_2O \rightarrow Zn(OH)_4^{2-} \tag{3}$$

Alternatively, the zincate ion, $Zn(OH)_4^{2-}$, can be allowed to precipitate to zinc oxide, $ZnO$, a second reaction product, in accordance with the following reaction:

$$Zn(OH)_4^{2-} \rightarrow ZnO + H_2O + 2OH^- \tag{4}$$

In this case, the overall reaction which occurs in the cell cavities is the combination of the three reactions (1), (2), and (4). This overall reaction can be expressed as follows:

$$Zn + \tfrac{1}{2}O_2 \rightarrow ZnO \tag{5}$$

Under real world conditions, the reactions (4) or (5) yield an open-circuit voltage potential of about 1.4V. For additional information on this embodiment of a zinc/air battery, the reader is referred to U.S. Pat. Nos. 5,952,117; 6,153,329; and 6,162,555, which are hereby incorporated by reference herein as though set forth in full.

The reaction product $Zn(OH)_4^{2-}$, and also possibly $ZnO$, can be provided to reaction product storage unit 104. Optional regeneration unit 106 can then reprocess these reaction products to yield oxygen, which can be released to the ambient air or stored in second reactant storage unit 110, and zinc particles, which are provided to fuel storage unit 108. In addition, the optional regeneration unit 106 can yield water, which can be discharged through a drain or stored in second reactant storage unit 110. It can also regenerate hydroxide, $OH^-$, which can be discharged or combined with potassium to yield the potassium hydroxide reaction solution.

The regeneration of the zincate ion, $Zn(OH)_4^{2-}$, into zinc, and one or more second reactants can occur according to the following overall reaction:

$$Zn(OH)_4^{2-} \rightarrow Zn + 2OH^- + H_2O + \tfrac{1}{2}O_2 \tag{6}$$

The regeneration of zinc oxide, $ZnO$, into zinc, and one or more second reactants can occur according to the following overall reaction:

$$ZnO \rightarrow Zn + \tfrac{1}{2}O_2 \tag{7}$$

It should be appreciated that embodiments of metal fuel cells other than zinc fuel cells or the particular form of zinc fuel cell described above are possible for use in a system according to the invention. For example, aluminum fuel cells, lithium fuel cells, magnesium fuel cells, iron fuel cells, and the like are possible, as are metal fuel cells where the fuel is not in particulate form but in another form such as sheets or ribbons or strings or slabs or plates. Embodiments are also possible in which the fuel is not fluid borne or continuously recirculated through the cell cavities (e.g., porous plates of fuel, ribbons of fuel being cycled past a reaction zone, and the like). It is also possible to avoid an electrolytic reaction solution altogether or at least employ reaction solutions besides potassium hydroxide, for example, without limitation, sodium hydroxide, inorganic alkalis, alkali or alkaline earth metal hydroxides. See, for example, U.S. Pat. No. 5,958,210, the entire contents of which are incorporated herein by this reference. It is also possible to employ metal fuel cells that output AC power rather than DC power using an inverter, a voltage converter, and the like.

In a second embodiment of a fuel cell useful in the practice of the invention system, the fuel used in the electrochemical reaction that occurs within the cells is hydrogen, the second reactant is oxygen, and the reaction product is water. In one aspect, the hydrogen fuel is maintained in the fuel storage unit 108, but the second reactant storage unit 110 can be omitted and the oxygen used in the electrochemical reaction within the cells can be taken from the ambient air. In another aspect, the hydrogen fuel is maintained in the fuel storage unit 108, and the oxygen is maintained in the second reactant storage unit 110. In addition, the optional reaction product storage unit 104 can be included or omitted, and the water resulting from discharge of the unit simply discarded or stored in the reaction product storage unit 104 (if present), respectively. Later, the optional regeneration unit 106 can regenerate water from another source, such as tap water, or from the reaction product storage unit 104 (if present) into hydrogen and oxygen. The hydrogen can then be stored in fuel storage unit 104, and the oxygen simply released into the ambient air or maintained in the second reactant storage unit 10.

In a third embodiment of a fuel cell useful in the practice of the invention system, a metal fuel cell system for providing primary and/or auxiliary/backup power to one or more loads (including without limitation a cooling unit) upon the occurrence of a power demand condition or a power outage condition, as applicable, is provided. Such system is characterized in that it has one, or any suitable combination of two or more, of the following properties: the system optionally can be configured to not utilize or produce significant quantities of flammable fuel or product, respectively; the system can provide primary and/or auxiliary/backup power to the one or more loads for an amount of time limited only by the amount of fuel present (e.g., in the range(s) from about 0.01 hours to about 10,000 hours or more, and in the range(s) from about 0.5 hours to about 650 hours, or more); the system optionally can be configured to have an energy density in the range(s) from about 35 Watt-hours per kilogram of combined fuel and electrolyte added to about 400 Watt-hours per kilogram of combined fuel and electrolyte added; the system optionally can further comprise an energy requirement and can be configured such that the combined volume of fuel and electrolyte added to the system is in the range(s) from about 0.0028 L per Watt-hour of the system's energy requirement to about 0.025 L per Watt-hour of the system's energy requirement, and this energy requirement can be calculated in view of, among other factors, the energy requirement(s) of the one or more load(s) comprising the system (In one embodiment, the energy requirement of the system can be in the range(s) from 50 Watt-hours to about 500,000 Watt-hours, whereas in another embodiment, the energy requirement of the system can be in the range(s) from 5 Watt-hours to about 50,000,000 Watt-hours); the system optionally can be configured to have a fuel storage unit that can store fuel at an internal pressure in the range(s) from about –5 pounds per square inch (psi) gauge pressure to about 200 psi gauge pressure.

Figure 1A:
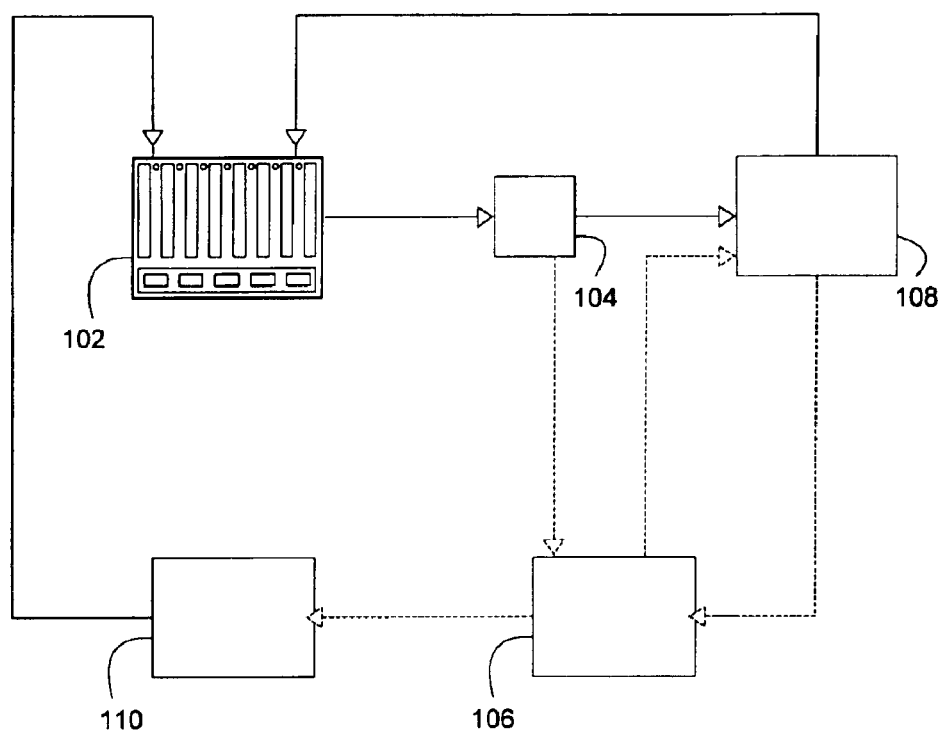
FIG. 1A is a block diagram of an alternative embodiment of a fuel cell.

FIG. 1A is a block diagram of an alternative embodiment of a metal-based fuel cell in which, compared to FIG. 1, like elements are referenced with like identifying numerals. Dashed lines are flow paths for the recirculating anode fluid when the optional regeneration unit is present and running. Solid lines are flow paths for the recirculating anode fluid when the fuel cell system is running in idle or discharge mode. As illustrated, in this embodiment, when the system is operating in the discharge mode, optional regeneration unit 106 need not be in the flow path represented by the solid lines.

Figure 2:
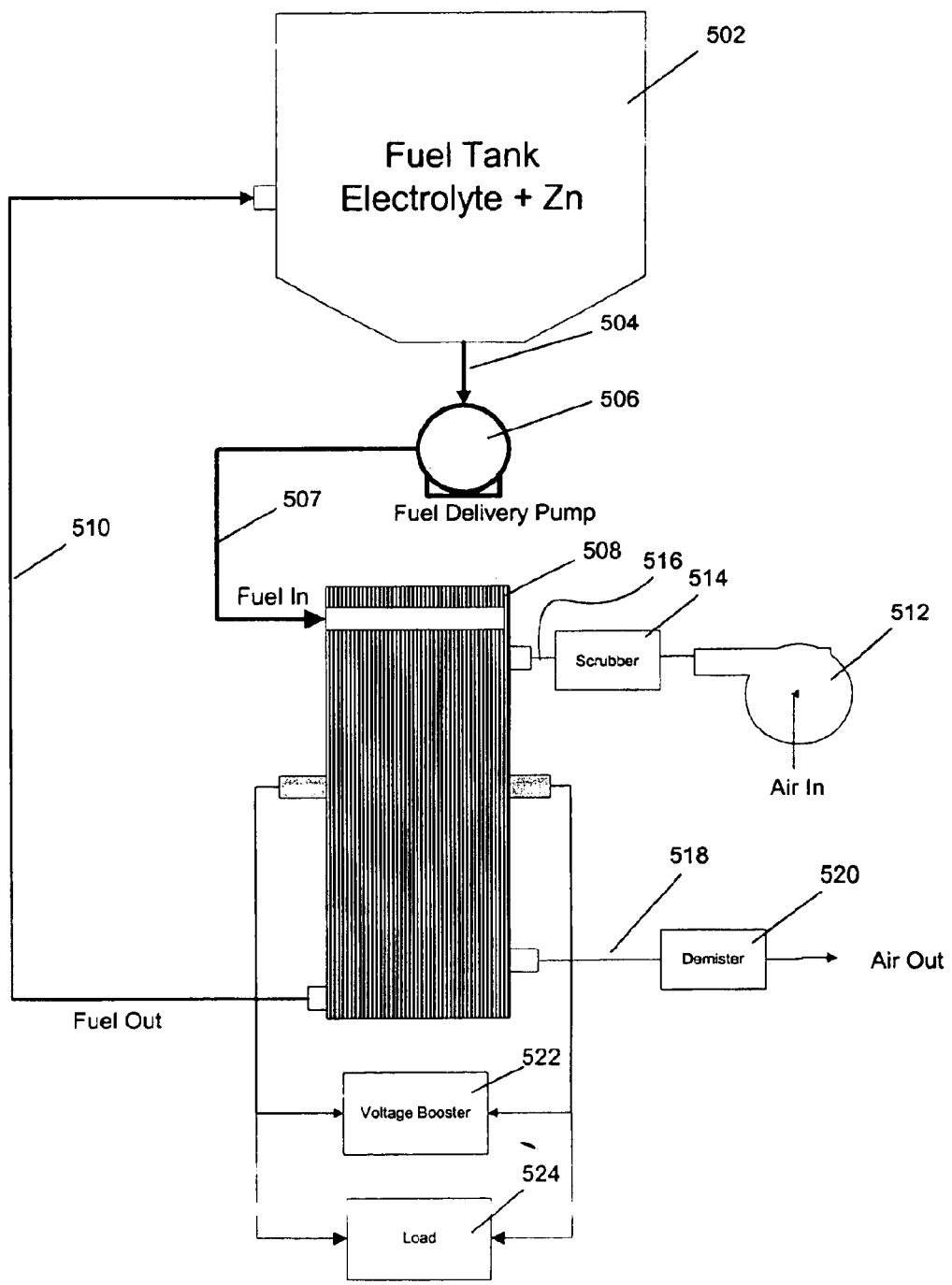
FIG. 2 is a block diagram of one implementation of a fuel cell.

Referring to FIG. 2, an implementation of a fuel cell system comprises a power source 508 and a fuel storage unit 502. A flowable fuel is contained with the fuel storage unit 502. A first flow path (line 504, pump 506, and line 507) delivers fuel from the fuel storage unit 502 to the power source 508. Some or all of this fuel is deposited into the individual cell cavities within the power source 508. (As described in U.S. Pat. No. 6,296,958, which is hereby incorporated herein by reference, one or more fluid mechanical devices may be employed to deposit the fuel into the cell cavities). A second flow path 510 delivers fuel that is not deposited into the cell cavities to the fuel storage unit 502. The flow of fuel from the fuel storage unit 502 to the power source 508 and back to the fuel storage unit 502 over flow path 510 may be periodic, intermittent, semi-continuous, or continuous. A third flow path (not shown in FIG. 2) delivers unused and/or partially used fuel and/or reaction products and/or spent reaction solution from the cell cavities back to an optional reaction product storage unit (not shown in FIG. 2) and/or the fuel storage unit 502 and/or to the second flow path 510. The system may further comprise an optional reaction product storage unit, an optional regeneration unit, an optional second reactant storage unit, an optional controller, and an optional power converter.

In the case in which the second reactant is oxygen provided from the ambient air, a scrubber 514 may be provided in order to remove carbon dioxide therefrom. However, such may not be needed if the second reactant is oxygen as obtained from a purified oxygen source.

In the case in which a liquid electrolyte is provided within the cell cavities, or to remove other substances from air expelled from the cell cavities, a demister 520 may be provided to demist air expelled from the cell cavities, i.e., remove droplets of electrolyte which may have emerged from the cell cavities into the outgoing air.

A voltage booster 522 may also be provided to boost the voltage output of the fuel cell as this voltage declines due to buildup of reaction product(s) in the cell cavities. Such a booster may be employed to provide a substantially constant voltage output from the fuel cell system over time.

An advantage of fuel cells relative to traditional power sources such as lead acid batteries is that they can provide longer term primary and/or auxiliary/backup power more efficiently and compactly. This advantage stems from the ability to continuously refuel the fuel cells using fuel stored with the fuel cell, from some other source, and/or regenerated from reaction products by the optional regeneration unit 106. In the case of the zinc fuel cell, for example, the duration of time over which energy can be provided is limited only by the amount of fuel which is initially provided in the fuel storage unit, which is fed into the system during replacement of a fuel storage unit 108, and/or which can be regenerated from the reaction products that are produced. Thus, the system, comprising at least one fuel cell that comprises an optional regeneration unit 106 and/or a replaceable fuel storage unit 108, can provide primary and/or auxiliary/backup power to the one or more loads for a time in the range(s) from about 0.01 hours to about 10000 hours, or even more. In one aspect of this embodiment, the system can provide back-up power to the one or more loads for a time in the range(s) from about 0.5 hours to about 650 hours, or even more.

Moreover, a system in accordance with the invention optionally can be configured to expel substantially no reaction product(s) outside of the system (e.g., into the environment).

As utilized herein, the term "about" comprises any deviation upward or downward from the value modified by "about" by up to 20% of such value.

As employed herein, the term "in the range(s)" comprises the range defined by the values listed after the term "in the range(s)", as well as any and all subranges contained within such range, where each such subrange is defined as having as a first endpoint any value in such range, and as a second endpoint any value in such range that is greater than the first endpoint and that is in such range.

As utilized herein, the term "significantly faster" comprises any increase in the time value modified by "significantly faster" that is in the range(s) greater than 10% of such time value.

EXAMPLES

Example 1

Fuel Cell System For Powering a Lawnmower

An exemplary fuel cell system suitable for use in powering a lawnmower can comprise two fuel cell stacks, a tank for zinc fuel and electrolyte, a pump for circulating zinc fuel pellets and KOH electrolyte between the fuel cell stacks and the zinc/electrolyte tank, an air blower for each cell stack, a heat exchanger for each cell stack, and electronics for electrical current control.

Each fuel cell stack can comprise twenty cells connected electrically in series, where fuel and electrolyte can be continuously recirculated through the pump, the cell stacks and the electrolyte tank. The maximum combined output power of an exemplary set of such stacks can be about 5.3 kW. Zinc fuel pellets and KOH electrolyte can be stored in the electrolyte tank that is mounted under the fuel cell stacks. The tank capacity of an illustrative electrolyte tank can be about 45 liters and can contain sufficient zinc to produce about 7 kWh of electricity.

Atmospheric air under low pressure from about 0.1 to 10 atmospheres can be fed into each cell of the cell stacks from the air blower, while oxygen depleted air can be evacuated back into the atmosphere. When the fuel cell has achieved an exemplary optimum operating temperature (e.g., about 55 C.), another pump can circulate the electrolyte from the tank through an air cooled heat exchangers.

The electronics systems can be used to initially draw power from a lead-acid battery to provide initial power for the electrolyte circulation pump. After a few seconds the power from the auxiliary lead acid battery can be switched off and all power for the pumps and air blowers can be provided by the zinc air fuel cell.

The electrical energy that can be generated by the fuel cell can be fed into a voltage booster device the output of which provides electrical current at constant voltage. This electrical energy can be then in turn fed to the electric motors and circuits that operate the lawnmower.

Example 2

Fuel Cell System For Powering a Personal Power Source

An exemplary fuel cell system suitable for use in powering a personal power source (e.g., a power source suitable for powering a variety of loads can comprise a fuel stack, a tank for zinc fuel and electrolyte, a pump for circulating zinc fuel pellets and KOH electrolyte between the fuel cell stacks and the electrolyte tank, an air blower, a heat exchanger, and electronics for electrical current control.

Each fuel cell stack can comprise twenty cells connected electrically in series, where fuel and electrolyte can be continuously recirculated through the pump, the cell stacks and the electrolyte tank. The maximum combined output power of an exemplary set of such stacks can be about 2.6 kW. Zinc fuel pellets and KOH electrolyte can be stored in the electrolyte tank that is mounted under the fuel cell stacks. The tank capacity of an illustrative electrolyte tank can be about 5.5 liters and can contain sufficient zinc to produce about 1.0 kWh of electricity.

Atmospheric air under low pressure from about 0.1 to about 10 atmospheres can be fed into each cell of the cell stacks from the air blower, while oxygen depleted air can be evacuated back into the atmosphere. When the fuel cell has achieved an exemplary optimum operating temperature (e.g., 55 C.), another pump can circulate the electrolyte from the tank through an air cooled heat exchangers.

The electronics systems can be used to initially draw power from a lead-acid battery to provide initial power for the electrolyte circulation pump. After a few seconds the power from the auxiliary lead acid battery can be switched off and all power for the pumps and air blowers can be provided by the zinc air fuel cell.

The electrical energy that can be generated by the fuel cell can be fed into a voltage booster device the output of which provides electrical current at constant voltage. This electrical energy can be then in turn fed to the electric motors and circuits that operate the lawnmower.

Example 3

Zinc/Air Fuel Cell System

With reference to FIG. 2, zinc pellets and KOH electrolyte can be contained within the fuel tank (electrolyte+zinc) 502. These particles can be initially at rest until such time as they are picked up in the stream of flowing KOH electrolyte, Q1, identified with numeral 504. The stream of KOH electrolyte and zinc pellets can be sucked from the tank and into the fuel delivery pump 506. From the fuel delivery pump 506, the stream can enter a pipe that directs them toward the fuel cell stack 508 through flow path 507. On entering the fuel cell stack 508, the electrolyte and pellets flow stream can first encounter a flow distribution manifold (not illustrated; exemplary manifold suitable for use found in U.S. patent application Ser. No. _____ To Be Determined, entitled "MANIFOLD FOR FUEL CELL SYSTEM,", filed on even date herewith, and previously incorporated herein by this reference) that can distribute electrolyte and zinc pellets substantially uniformly to each of the plurality of individual cells. Some zinc pellets can drop into the fuel cell anode cavity (not illustrated) and remain there until they dissolve and some pellets remain in the flow stream and exit the cell via a flow path Q3, which is identified with numeral 510. The flow can be returned to the electrolyte tank via the flow path Q3. Although some zinc pellets that fall into the fuel cell anode cavity can be completely dissolved, a few of the pellets can be only partially dissolved; because of their small size, these partially dissolved pellets can exit the anode cavity and enter the flow stream from the cell and pass back to the electrolyte tank, via flow path Q2 (not shown in FIG. 2, but in parallel with flow path Q3).

Atmospheric air can be sucked into a blower 512 and then can be passed through a carbon dioxide scrubber 514. From there, the air flow can enter a pipe 516 which directs air into a manifold (not illustrated) where it is split evenly into a plurality of flows streams, one for each cell. The air can pass down the back of the cathodes and can become somewhat or substantially completely depleted in oxygen. This air can exit the cell stack via another manifold and can then pass into an exhaust pipe 518. The exhaust air flows can be then passed through a demisting device 520 to remove any small particles of electrolyte and can be then evacuated into the atmosphere.

Electrical current can pass through the fuel cell stack and into a voltage booster 522. This voltage booster provides variable output power of constant voltage but of varying current. From the voltage booster, the electrical power can be passed to the electrical load 524.

While various embodiments of the invention have been described, it will be apparent to those of ordinary skill in the art that many more embodiments and implementations are possible that are within the scope of this invention

What is claimed is:

1. A fuel cell system comprising:

a power source having one or more cell cavities;

a fuel storage unit for containing flowable fuel;

a first flow path for providing flowable fuel from the fuel storage unit to the power source;

a second flow path for providing flowable fuel, which has not been deposited into the one or more cell cavities, back to the fuel storage unit; and a third flow path for providing unused and/or partially used fuel and/or reaction product(s) and/or spent reaction solution to a one or more of a reaction product storage unit, the fuel storage unit, and the second flow path.

2. The system of claim 1 further comprising a scrubber for removing carbon dioxide from a source of oxygen for an oxygen reduction reaction occurring within the cells of the power source.

3. The system of claim 1 further comprising a demister for removing liquid droplets from air expelled from the cell cavities of the power source.

4. The system of claim 1 further comprising a voltage booster for boosting the voltage output of the fuel cell system.

* * * * *